M. W. LEONHARDT.
ADJUSTABLE DUST COLLECTOR.
APPLICATION FILED MAR. 3, 1921.
1,393,553.
Patented Oct. 11, 1921.
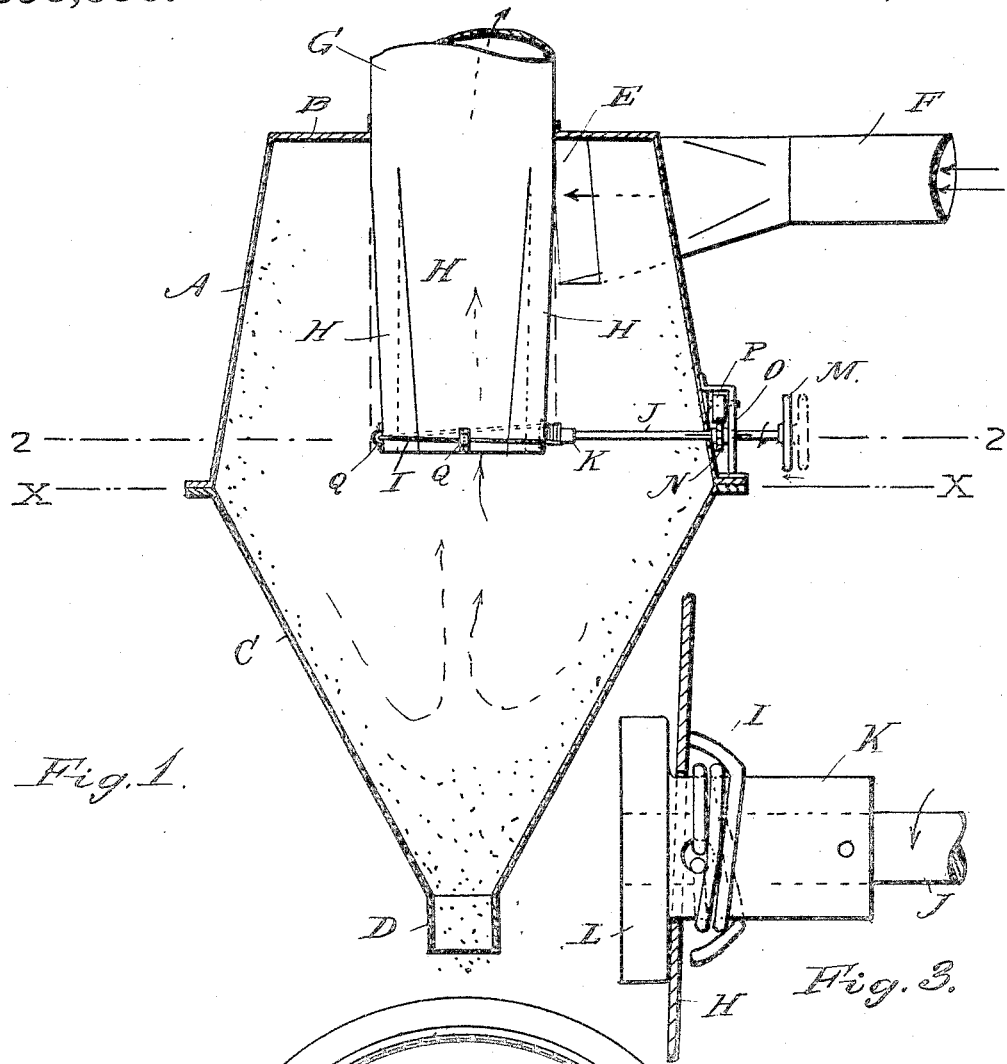
Fig. 1.
Fig. 3.
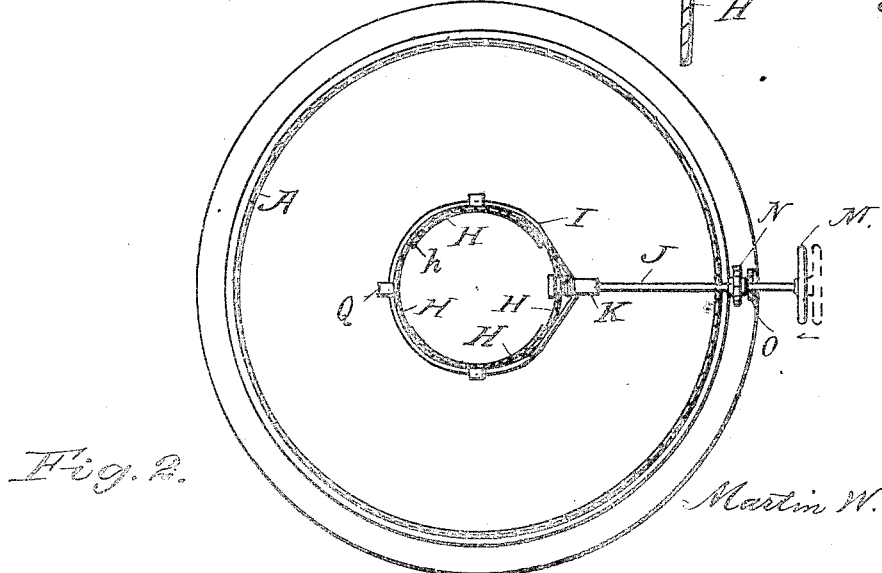
Fig. 2.
Inventor
Martin W. Leonhardt,
By H. M. Plaisted,
Attorney.

UNITED STATES PATENT OFFICE.

MARTIN W. LEONHARDT, OF CHATTANOOGA, TENNESSEE.

ADJUSTABLE DUST-COLLECTOR.

1,393,553.   Specification of Letters Patent.   Patented Oct. 11, 1921.

Application filed March 3, 1921. Serial No. 449,381.

*To all whom it may concern:*

Be it known that I, MARTIN W. LEONHARDT, a citizen of the United States, residing at Chattanooga, in the county of Hamilton and State of Tennessee, have invented certain new and useful Improvements in Adjustable Dust-Collectors, of which the following is a specification.

This invention relates to certain new and useful improvements in adjustable dust collectors, the peculiarities of which will be hereinafter fully described and claimed.

The main object of my invention is to provide means for adjusting the ratio between the areas of the inlet pipe and the outlet pipe of a cyclone dust collector, to correspond to the velocity and pressure of the dust-laden air entering the collector, so that the dust will be deposited in the collector and the air leaving the collector will be practically free from dust.

Secondly: to change the area of the outlet pipe to correspond with the force of the entering dust-laden air; and thirdly, to effect such adjustment of the said ratio while the collector is operating.

In the well known form of cyclone dust collector comprising a body portion of nearly cylindrical form having a tangential inlet pipe near the top, and having a bottom of conical shape with outlet for the dust at the bottom, the tubular discharge pipe depending from the upper end generally bears the relation to the inlet pipe of twice or more the area of cross sections. When the dust-laden air is delivered by a fan tangentially to said cyclone the sudden expansion, together with the whirling motion, causes the dust to assume a position next to the inside of the collector shell and proceed downward to the bottom of the cone, while the center of the vortex is more or less free from dust and the air is drawn off by said tubular discharge pipe. It has been found by experience that the velocity and pressure of the entering dust-laden air varies according to the size and speed of the fan causing the delivery of the air to the cyclone, so that a variable efficiency results when the ratio between the areas of said inlet and outlet pipes is fixed to agree with a certain pressure and velocity of air. More or less dust therefore escapes through the outlet pipe when the velocity and pressure of the entering air is not that which properly corresponds to said ratio.

It is my aim to provide means whereby the ratio above mentioned may be varied while the collector is operating, and so make it accord with the velocity and pressure of the air being delivered to the collector.

In the accompanying drawing on which like reference letters indicate corresponding parts, Figure 1 represents a vertical sectional elevation on a central plane of a collector exemplifying my invention,—the central outlet being shown in elevation with my preferred form of adjusting means applied thereto; Fig. 2 a plan view of the same on the horizontal plane 2—2 of Fig. 1; and Fig. 3 an enlarged detail of the end of the winding rod.

The letter A designates the upper body portion of a cyclone dust collector, preferably flaring outward somewhat as it extends downward from the top B, and provided with a conical bottom C having an outlet D for the collected dust. In the upper side portion of said body A is an opening E connected to a horizontal tangentially located pipe F through which enters the dust-laden air to said collector. Depending from the top D is a centrally located tubular outlet pipe G the bottom end of which extends downward substantially to the horizontal plane X where the body and conical bottom join, and is open at the bottom end. My preferred construction for varying the ratio between the area of the outlet discharge pipe and the inlet pipe, applies to the outlet pipe and consists in reducing the area of the lower end without presenting any deflecting surfaces to the discharge of the air upward through the outlet. In the construction illustrated, the lower end of the depending tubular outlet pipe is slit upward from the bottom end nearly to the top B of the body, so as to form a multiple number, say four, of segmental tongues H. The edges of the slits are beveled or turned outward as indicated at $h$ in Fig. 2 so that when a flexible band I passing around near the lower end of the outlet pipe, is compressed circumferentially upon said tongues, they will overlap each other and reduce the area of the lower end of the outlet pipe accordingly. In other words, instead of being a cylindrical pipe, as dashed in Fig. 1, this tubular outlet pipe becomes a frustum of a cone with the smaller end downward, and the area is varied as may be required.

Any suitable means for compressing the lower end of the tongues H may be employed, but I prefer to use a winding rod J on the inner end of which is a spool K having a flange L adapted to engage the inside of the tongue H through which the spool passes as shown in Fig. 3 and causes the rod J to slide in its bearing in the side of the collector, as contraction or expansion of the tongues occurs under the rotation of the rod J. The flexible band I winds up on said spool or otherwise on the rod, from opposite directions, when the rod is rotated by the handwheel M outside of the collector. On the rod where it passes through the collector side is a keyway in which is mounted a feather key engaging also a ratchet N mounted on the rod between the side of the collector and a bracket O Fig. 1, so that the ratchet will remain in engagement with a pawl P mounted in the bracket, when the rod J slides in and out of the collector. In this way the contraction and expansion of the area of the outlet pipe will occur centrally within the collector. On the outside of the segmental tongues are a series of loops or hooks Q forming shoulders through which the flexible band passes, which prevent the band from sliding off of the tapering tongues when assuming the conical position before mentioned. The winding rod may be otherwise located if desired.

Thus it will be seen that without interfering with the operation of the collector, I can vary the ratio between the areas of the outlet pipe and the inlet pipe of said collector, by my construction applied to the outlet pipe. There is no deflecting surface opposite the lower end of the outlet pipe that may tend to stir up the whirling dust within the cyclone, but the outlet end is perfectly open no matter what the area it may be adjusted to, and presents only the edge of the pipe to the outgoing air, practically free from dust in the vortex of the collector. It is therefore an easy matter to so contract or expand the outlet pipe as to secure the proper ratio between its area and that of the inlet pipe, and thus discharge the air from the collector practically free from dust.

I claim;

1. A cyclone dust collector comprising a tangential inlet pipe, and a central tubular depending outlet pipe having its lower end divided upward from the bottom into a plurality of segmental tongues adapted to be variably compressed circumferentially and overlap each other so as to form a variable cone diminishing downward, and means to effect said varied compression of said tongues and consequent varied area of said outlet pipe.

2. A cyclone dust collector comprising a central depending tubular pipe having its lower end divided upward into a plurality of segmental tongues adapted to be compressed circumferentially, a flexible band embracing said tongues, a winding rod having one end extending outside the cyclone shell and adapted to be rotated, and the inner end engaged by the ends of said flexible band, and means to retain said rod in any rotated position and consequent compression of said tubular pipe.

3. A cyclone dust collector having a central depending tubular outlet pipe divided into segmental overlapping tongues forming a variable cone frustum with smaller end downward, a horizontal winding rod extending from the lower end of said outlet pipe rotatably and slidably outward through the side of the collector, a winding spool on the inner end of said rod engaging one of said tongues so as to slide inward when said tongues are contracted, a ratchet slidably mounted on said rod, and a pawl for said ratchet.

4. A cyclone dust collector comprising a central depending tubular outlet divided into segmental tongues adapted to be compressed to form a frustum, a flexible band compressively inclosing said tongues, shoulders on said tongues preventing said band from sliding downward, and means to cause said band to act compressively on said tongues.

5. A cyclone dust collector comprising a depending tubular pipe having lengthwise slits, the edges of said slits being beveled so as to readily overlap each other and adjust themselves to a different diameter of outlet upon circumferential compression, and means to exert said compression.

In testimony whereof I have affixed my signature.

MARTIN W. LEONHARDT.